United States Patent [19]

Pearson

[11] 3,882,389
[45] May 6, 1975

[54] METER CONSTRUCTION
[75] Inventor: David B. Pearson, Raritan, N.J.
[73] Assignee: Weston Instruments, Inc., Newark, N.J.
[22] Filed: Aug. 24, 1973
[21] Appl. No.: 391,496

Related U.S. Application Data
[62] Division of Ser. No. 173,425, Aug. 20, 1971, Pat. No. 3,764,909.

[52] U.S. Cl.............................................. 324/151 A
[51] Int. Cl............................................... G01r 1/16
[58] Field of Search.................. 324/151, 151A, 154

[56] References Cited
UNITED STATES PATENTS
2,887,657   5/1959   Lamb et al...................... 324/151 A
3,551,812   12/1970  Mothes............................ 324/151 A Primary Examiner—Alfred E. Smith
Assistant Examiner—Rolf Hille
Attorney, Agent, or Firm—William R. Sherman; Walter Kruger

[57] ABSTRACT
An electric meter particularly characterized by a small number of moving parts and simplified assembly by virtue of fixed cooperating locating surfaces on the elements and sub-assemblies of the meter. A magnetic circuit including a yoke and magnet are constructed to snap into an insulating base in a predetermined position on the base. A coil assembly is accurately positioned for rotation on the supporting base. Cooperating locating surfaces provide for accurate predetermined positioning of the axis of rotation of the coil relative to the magnetic circuit. Additional features of the meter construction reside in a zero adjust knob mounted in a cover for the meter, a unique base, casing, and cover which snap together, a coil support frame of unique construction and which includes motion limiting elements which limit the permissible extent of movement of the coil in the event of shock or impact to positions well within the elastic limit of the suppports which mount the coil for rotation, whereby the number of different parts required to form meters of different sizes is maintained at a minimum, a unique insulating material base with flexibility to permit expanding the base during assembly of the meter, and sub-assemblies, components, and elements which can be assembled in only one position and orientatiion to assure proper assembly of the meter.

39 Claims, 8 Drawing Figures

METER CONSTRUCTION

This is a division of application Ser. No. 173,425, filed Aug. 20, 1971 now U.S. Pat. No. 3,764,909.

This invention relates to an electric meter of the moving coil type which is particularly adapted for manufacture by mass production methods. In addition, the invention permits a method of manufacturing both the moving coil and the meter including the coil, on a mass production basis using a minimum number of parts and assembly steps to provide an accurate instrument.

Because of the number of steps required to assemble and the number of parts required for constructing measuring instruments of the moving coil type such as D'Arsonval meters, such meters have not in the past been as capable of mass production manufacture as the meter of the present invention. Because of the large number of parts, and the numerous adjustments required, prior meters are relatively expensive. In these prior art meters, forming the various parts for the meter and assembling same to form the meter is quite time consuming. Typical steps required are forming the moving coil portion of the instrument, connecting suitable supports to the frame of the moving coil to support jewels or a taut band (depending on the suspension for the instrument) forming a casing, mounting the magnetic circuit for the meter in the casing, installing the moving coil, connecting taut bands or bearings to the moving coil to suspend the coil, aligning the suspension for the coil so the coil rotates about a predetermined axis, adjusting the magnetic circuit to provide a desired range of coil deflection characteristics, mounting a meter scale with appropriate indicia corresponding to the deflection characteristics of the meter, balancing the coil to compensate for the weight of the pointer, and zero adjusting the meter. In the past, the suspension of the coil on its base support has been accomplished manually and this step is quite time consuming since the coil must be carefully aligned with fixed connectors on the base support and various parts and pieces of the suspension are then connected to suspend or otherwise mount the coil for rotation. Then, because it is difficult to always mount a coil rotation about the same axis in each and every assembly, it is necessary to adjust or reposition the magnetic circuit to compensate for slight differences in the location of the axis of rotation of the coil for successively assembled instruments of the same type. Finally, even after pointers and counter balance weights are connected to the moving coil, it is necessary to test the instrument to determine what the scale deflection characteristics of the meter are and then select from one of several scales a scale that accurately represents the deflection characteristics of the instrument. Correspondingly, the prior art meters simply have too many parts to permit economical assembly even by mass production methods. As a result it was quite expensive to provide a meter with an accuracy of for example, 2% of full scale deflection.

The meter and moving coil of this invention overcome many of the disadvantages of the prior art moving coil instruments. By virtue of its unique construction this meter uses only a small fraction of the number of parts required in previous meters. Since the number of parts is reduced, the number of assembly steps is correspondingly reduced with the result that the meter is well adapted to be manufactured on a mass production assembly line basis to provide an accurate meter with good tracking characteristics.

Additional advantageous features of the meter construction of this invention are a base or support structure for the various elements of the meter, this base also being of precision manufacture and preferably of an insulating plastic material. Among the characteristics of this base are predetermined fixed locating surfaces for the elements forming the magnetic circuit of the meter, and locating surfaces for the support elements for the moving coil to assure that coils of successively manufactured meters all rotate about essentially the same axis relative to the base and terminal locators which provide for rapidly connecting the coil to external terminals.

In the preferred embodiment, the magnetic circuit has a diametrically split yoke which includes two identical semi-circular half shells of a magnetic material such as soft iron arranged to receive therebetween a permanent magnet in a predetermined position relative to the axis of rotation of the coil. The half shells of magnetic material are precisely positioned in the base by virtue of cooperating locating surfaces on the base and shells, and the permanent magnet is precisely positioned within the yoke by virtue of cooperating locating surfaces on the shells, permanent magnet, and the base. Since the axis of rotation of the coil is predetermined by virtue of the cooperating locating surfaces on the insulating material plastic base and the support elements for the coil, and since the various parts of the magnetic circuit are each precisely located on the base and relative to each other, it is assured that the axis of rotation of the coil is at the same position with respect to the magnetic circuit in successively assembled meters.

The several locating surfaces on the supporting base are integrally formed with the base and the construction of the base, magnetic circuit parts, and coil assembly is such that the meter movement is easily assembled by "snapping" the parts together without additional fasteners. In addition, the base includes integral mounts for rigid conductors to carry the current to the meter coil. This arrangement avoids the need for threading fine wires to the terminals of the meter o-ring assembly. An additional advantage of the positioning mounts and the rigid conductors is that these conductors are precisely located on the base relative to openings in the casing for the meter, and correspondingly, provide for mounting the meter movement in its casing merely by sliding the elements together until snap fingers secure the meter movement to the casing. There is no need for any special alignment during this operation, since the base and casing have cooperating slide surfaces which guide the parts together.

With regard to construction economy, parts of the meter which are used in pairs, for example, and the split rings which form the yoke of the magnetic circuit, can be of identical construction so the total number of different precision parts is maintained at an absolute minimum. Moreover, these parts are so constructed relative to the parts with which they interengage and are connected that they can only be installed in one position, during the assembly of the meter. The parts will not fit unless they are properly oriented.

An additional significant advantage of the construction of the meter is that almost all of the same basic parts are used in the construction of a meter for jewelled (bearing) movement or taut band suspension. For example, using the same magnetic circuit, base support and coil support blanks, a meter of either the taut band suspension type or jewelled suspension type can be constructed merely by assembling the proper suspension elements at appropriate times during the manufacturing and assembly operations. However, most of the manufacturing steps for the meter for each type of suspension are the same and are accomplished in the same manner for both types of instruments.

By virtue of the upwardly opening supporting base of an insulated plastic material such as a polysulfone, by virtue of the construction of the base which makes the base inherently elastic to a certain extent and by virtue of the split yoke construction for the magnetic circuit of the meter, assembly is vastly simplified by providing for unidirectional insertion of the first yoke half, then the coil, then the permanent magnet, and then the second yoke half, to assembly the meter with the parts thereof in predetermined precise alignment and at an extremely rapid rate.

Additional advantages and features of the meter of this construction reside in the base of the same meter movement and a case with certain parts of the same size regardless of the size of the scale of the meter, whereby the costs of tooling for the user of the meter are substantially reduced, which further includes integrally formed stops in limit the extent of rotation of the zero adjuster knob whereby the possibility of damage as a result of over-rotation of the zero adjust is Correspondingly, an object of this invention is a low cost moving coil meter or other instrument in which the meter movement can be readily assembled to provide a reasonably accurate instrument at low cost.

Another object is a meter including a base with locating surfaces to provide for accurate positioning of the magetic circuit for the meter as well as for mounting the supports for a moving coil in precise predetermined relation to the magnetic circuit and base.

Another object is a meter in which a supporting base is provided with both fixed locating surfaces and retaining elements, the magnetic circuit of the meter is installed in the base by the simple expedient of positioning same against the locating surfaces and then pressing the parts thereof into interlocked position with the base, and in which support elements for the coil include locating and retaining portions which interengage with cooperating portions of the base to both position and retain the support elements on the base.

A further object is a unique method of assembling the meter of this invention in which the several parts of the magnetic circuit and coil are assembled to a base in a predetermined sequence and in which the coil and its support elements are so mounted on the base that the rotational axis of the coil is at a predetermined location relative to the base and the magnetic circuit.

Another object is a meter which is assembled primarily by snapping together the various components of the meter including the magnetic circuit, case, scale, cover, and various other components whereby the need for separate fasteners is substantially eliminated.

Another object is a meter of the moving coil type in which the magnetic material yoke thereof is transversely split to facilitate assembly by mass production methods and simplify mounting the coil for rotation about a permanent magnet core.

An additional object is a combined zero adjust and support element of integral construction to which the taut bana or spiral spring of the coil suspension is directly connected and which has integral gear teeth in mesh with gear teeth of the usual adjust knob, the integral element substantially reducing the number of required parts for the meter.

Another object is a meter construction in which the various parts are so arranged and constructed that during assembly of the meter each part can only be mounted in one possible position, whereby there is no chance for improper assembly.

A further object is a meter movement assembly so arranged and constructed that relatively rigid conductors are supported in a predtermined position on the base of the meter to permit final assembly by merely sliding the meter movement into a casing without the need for threading or otherwise connecting fine flexible terminal wires during such assembly.

Still another object is a meter with no cements or other moisture sensitive elements which could subsequently affect the accuracy of the meter.

Numerous other objects, advantages, and features of the invention will become apparent with reference to the accompanying drawings which form a part of this specification and in which:

I THE METER ASSEMBLY

Figure 1:
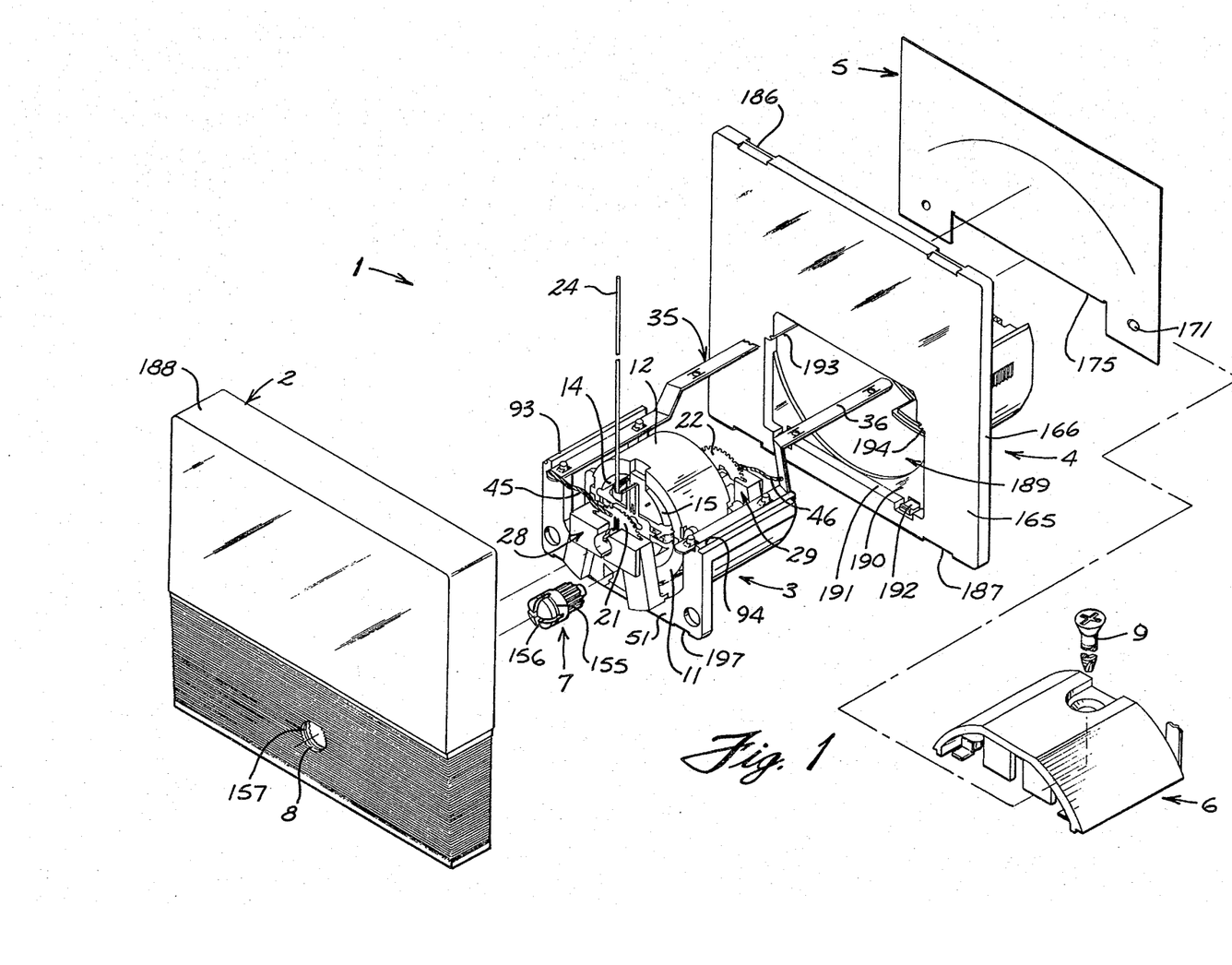
FIG. 1 is an exploded pictorial view of a D'Arsonval meter constructed in accordance with this invention.

Referring now to the drawings and particularly to FIG. 1 there is shown a meter 1 constructed in accordance with this invention. As shown at FIG. 1, the meter includes a cover 2, a meter movement 3, a case 4, a scale 5 and a terminal adapter assembly 6. In addition, there is a zero adjust knob 7 which is mounted for rotation in an opening 8 in cover 2. The various parts of the meter so far described are adapted to be assembled by sliding and/or snapping these parts together with the exception of the terminal adapter 6 which is held in position by the screw 9, and which is only used where a particular meter terminal is needed.

A. THE METER MOVEMENT

Figure 2:
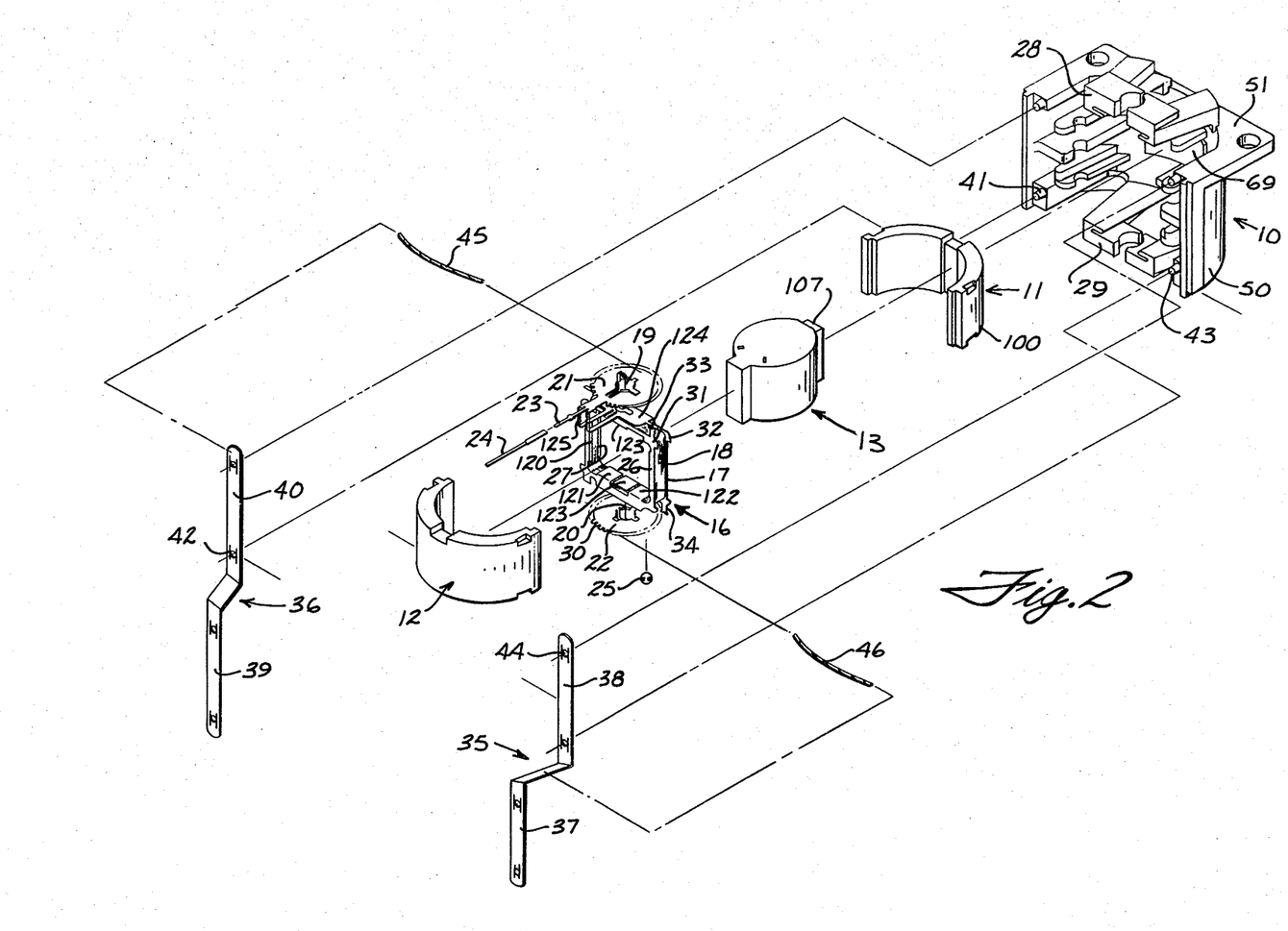
FIG. 2 is an exploded pictorial view of the meter movement of this invention and its supporting base.

FIGS. 1 and 2 show meter movement 3, and the manner in which the parts and sub-assemblies constituting the meter movement are assemble. A supporting base 10 supports all the components of meter movement 3. The magnetic circuit for the meter includes a lower yoke element 11 which is essentially semi-circular and an upper yoke element 12 which is identical to the lower yoke element and is merely the lower element turned 180° circumferentially. The yoke elements 11 and 12 are formed from soft iron or other magnetic material with magnetically non-retentive characteristics, and the yoke elements co-operate to form the usual yoke ring.

Positioned between yoke elements 11 and 12 is a permanent magnet 13. The contour of the surface of the permanent magnet 13 is such that generally crescent shaped gaps 14 and 15 are formed at each side of the magnet between the opposing surfaces of the yoke elements 11 and 12 (FIG. 1).

A moving coil assembly 16 includes a generally rectangular coil form 17 with a coil 18 wound on the coil form. The moving coil assembly is supported by taut bands 19 and 20 which are secured respectively to the front and rear of the coil assembly 16. The outer ends of the bands are secured respectively to gear toothed support elements 21 and 22. While a portion of this invention is directed to a meter having a coil suspended by taut bands, a quite similar coil assembly is used for a jewelled or pivot bearing version of the meter of this invention, as will subsequently be described in detail. Extending outwardly and upwardly from the front of coil assembly 16 is a staff 23 on which a hollow pointer 24 is mounted. At the rear of coil assembly 16 is a counter balance weight 25 which counterbalances pointer 24.

Yoke elements 11 and 12 are dimensioned and configured to snap into supporting base 10 in a manner which will subsequently be described in detail. The magnet 13 is maintained in a clamped position between the yoke elements, and the coil assembly 16 extends around the magnet such that its longitudinal sides 26 and 27 extend respectively through the gaps 14 and 15.

Front support element 21 is rotatably supported in a front support structure 28 of base 10 and rear support element 22 is rotatably supported in a rear support structure 29 of the base. The support elements 21 and 22 are each of integral construction and each have gear teeth 30 so a desired one of these elements can be directly engaged by the spur teeth of a zero adjust knob, such as the zero adjust knob 7 of FIG. 1 to rotate the appropriate support element to zero adjust the pointer 24.

Coil form 17 includes two initially identical coil form parts 31 and 32 of electrically conductive material such as phosphor bronze. One end of the coil 18 is connected to a terminal 33 on coil form part 31 whereas the other end of the coil 18 is connected to terminal 34 on the coil form part 32. These coil form parts 31 and 32 are in insulated relation to each other so the respective taut bands 19 and 20 which are electrically connected to the respective coil parts act as conductors and carry the current for energizing the coil 18. The support elements 21 and 22 are each formed from an electrically conducting material and are electrically connected to the respective taut bands 19 and 20. External electrical connections to the support elements 21 and 22 are made via the rigid terminal conductors 35 and 36 which are mounted on top of the base, and the terminal adaptor 6, when used. As shown at FIGS. 1 and 2, conductors 35 and 36 are each formed from flat strips of metal and have good electrically conducting characteristics. Terminal 35 is bent intermediate its ends to elevate rear leg 37 of the conductor relative to front leg 38. Identically, conductor 36 is bent intermediate its ends so rear leg 39 is offset from and above front leg 40.

A pair of condutor mounting post 41 are provided at the top of base 10 and tinnerman nut type openings 42 are formed in leg 39 so conductor 36 can be pressed over the posts to secure the conductor to the supporting base without the use of additional fasteners. Similarly, supporting posts 43 project upwardly from the other side of supporting base 10 to provide for connecting conductor 35 to the base by forcing posts 43 through openings 44 of leg 37. Conductor 35 is electrically connected to front support element 21 by a flexible braided wire conductor 45. Similarly, rear support element 22 is electrically connected to conductor 36 by a braided wire 46. The braided wires 45 and 46 have sufficient flexibility that support elements 21 and 22 can be rotated a sufficient amount, within predetermined limits, to zero adjust pointer 24.

B. THE SUPPORTING BASE

Base 10 is an integral structure molded from an electrically insulating plastic material with dimensionally stable characteristics, advantageously, a polysulfone material.

Figure 3:
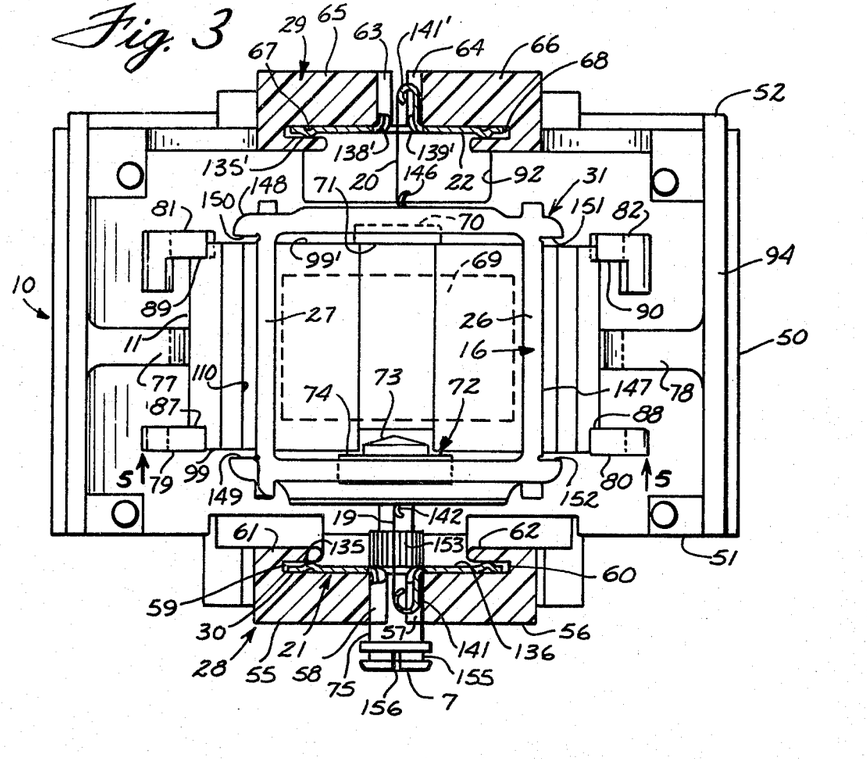
FIG. 3 is a top plan view of the meter movement and base with the upper yoke element and magnet removed and with portions of the base cut away for purposes of explanation.
Figure 4:
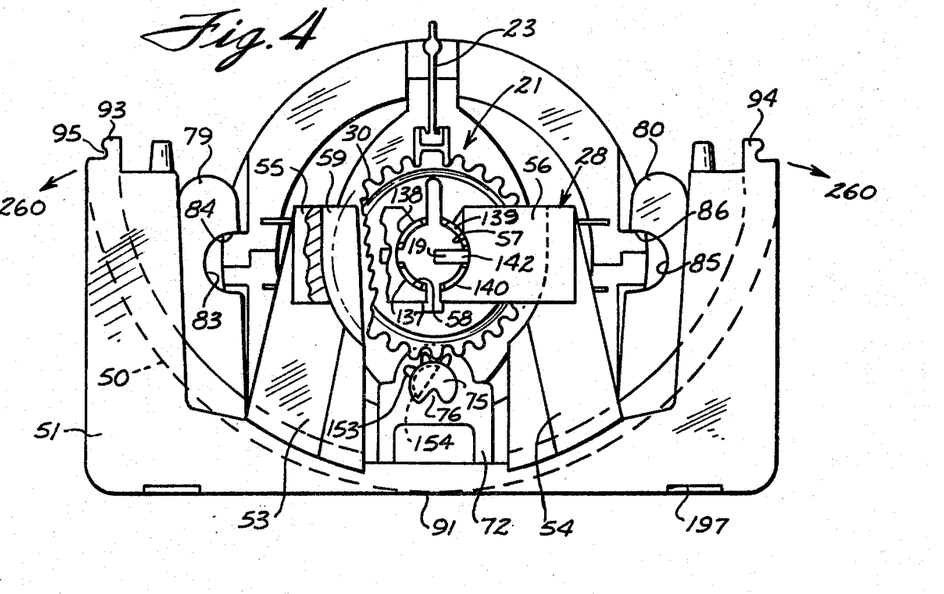
FIG. 4 is a front elevational view of the meter movement with portions of the base cut away.

As shown at FIGS. 2–4, base 10 has a generally semi-circular hollow side wall 50 with a generally rectangular front flange 51. Front support structure 28 projects forwardly of front flange 51 and rear support structure 29 projects beyond end 52 of side wall 50. Front support structure 28 includes a pair of upwardly and inwardly directed integral legs 53 and 54. At the upper ends of these legs are inwardly extending horizontal blocks 55 and 56 which terminate in spaced relation to each other and have facing cylindrically curved surfaces 57 and 58 respectively each of which is greater than 90° in circumferential extent. Formed in the respective blocks 55 and 56 are arcuately curved recesses 59 and 60 which face each other and open upwardly to permit inserting front support element 21 downwardly into a seated position in the recesses, in a manner which will subsequently be described in detail. Recess 59 is defined in part by an upright inner wall 61 and recess 60 is defined in part by an opposed upright inner wall 62.

Rear support structure 29 is essentially the same as front support structure 28 and includes blocks presenting facing cylindrically curved surfaces 63 and 64 in the respective blocks 65 and 66, and recesses 67 and 68 to receive rear support element 22.

Figure 5:
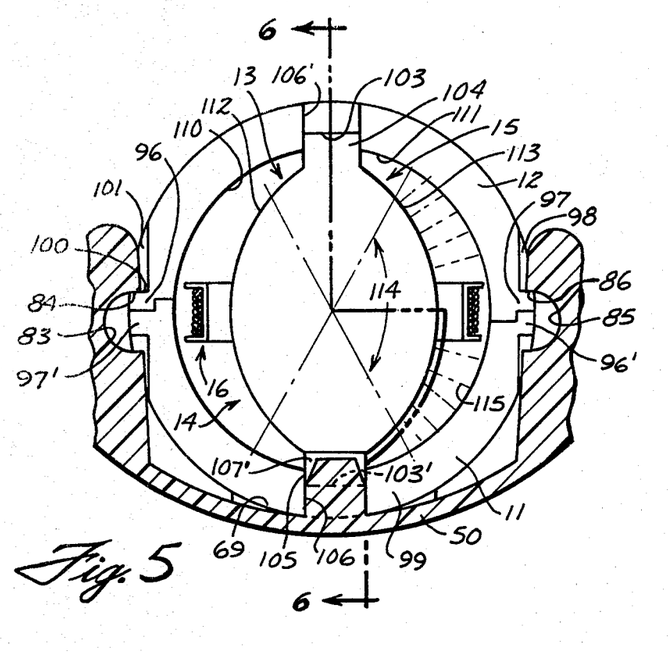
FIG. 5 is a front elevational view in section taken along line 5—5 of FIG. 3 and showing the magnetic circuit of the meter.

As shown at FIG. 2, 3, and 5 the base also includes a curved yoke support pad 69 which projects upwardly from the bottom of side wall 50 to provide a seat to support lower yoke element 11. The pad 69 is located generally centrally of the supporting base and provides a seat for yoke element 11. Between pad 69 and rear support structure 29 is a rear positioning post 70. Rear post 70 projects upwardly to a level above pad 69 and presents a front surface 71 which engages magnet 13 and lower yoke element 11 to both position and prevent movement of these elements in a direction toward rear support structure 29. Between pad 69 and front support structure 28 is a front positioning post 72 which has a pointed positioning projection 73 which faces toward surface 71 of the rear post, and also has a pair of locating surfaces 74 on each side of projection 73. On the forward side of post 72 is a recess 75 which has a generally cylindrical side wall interrupted at its bottom by an upwardly projecting stop 76. Recess 75 and stop 76 cooperate with zero adjust knob 7 to limit the extent of rotation of the knob, in a manner which will subsequently be described in detail.

Extending inwardly from side wall 50 at a location approximately midway between the front and rear of the side wall, are a pair of transversely aligned reinforcing ribs 77 and 78 which add rigidity to the upper portions of the side wall. These ribs also function to clamp yoke elements 11 and 12 transversely as will later be described in detail.

Offset toward the front of side wall 50 and projecting upwardly from the side wall are a first pair of transversely aligned yoke retaining legs 79 and 80 which locate and secure yoke elements 11 and 12 in position on the supporting base 10. There are also a pair of transversely aligned rear yoke positioning and retaining legs 81 and 82 which project upwardly from side wall 50 and are offset toward the rear of the side wall. The locating and retaining legs 79–82 and the surfaces 71 and 74 of the positioning posts cooperate with the yoke elements and the magnet to both accurately position the magnet and yoke elements as well as to secure same to the base merely by pressing these parts into position. In this regard it will be noted that legs 79 and 81 each have accuate recesses 83 formed therein which present a downwardly facing yoke retaining edge 84, and similarly, legs 80 and 82 include arcuate recesses 85 which present a downwardly facing yoke retaining edge 86. In addition, the respective legs 79–82 include longitudinally facing yoke retaining surfaces 87–90 which provide additional surfaces for locating and positioning the yoke elements within supporting base 10.

By virtue of its construction, the supporting base is somewhat flexible along the central portion 91 of the side wall between the legs 53 and 54, yet the remaining portions of the side wall outwardly of legs 53 and 54 are quite rigid by virtue of the bracing obtained from the ribs 77 and 78 and the legs 79–82. Such flexibility along the center of the side wall facilitates assembly as will subsequently be described.

At the bottom of wall 50 at a location offset toward end 52 is a generally rectangular recess 92 which opens rearwardly. This recess is provided to receive a forwardly projecting wall of case 4, as will subsequently be described. Projecting upwardly from wall 50 are longitudinal ribs 93 and 94. Each rib extends the length of the side wall as shown at FIG. 3 and has a groove 95 which seats in a mating projection in case 4 to hold the base against movement.

C. THE MAGNETIC CIRCUIT

Figure 6:
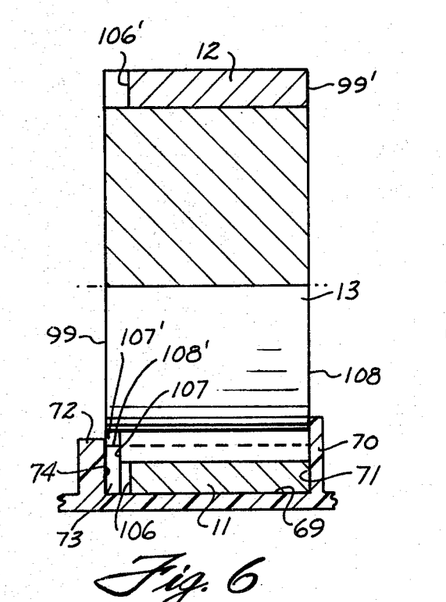
FIG. 6 is a side view in section taken along line 6—6 of FIG. 5.
Figure 7:
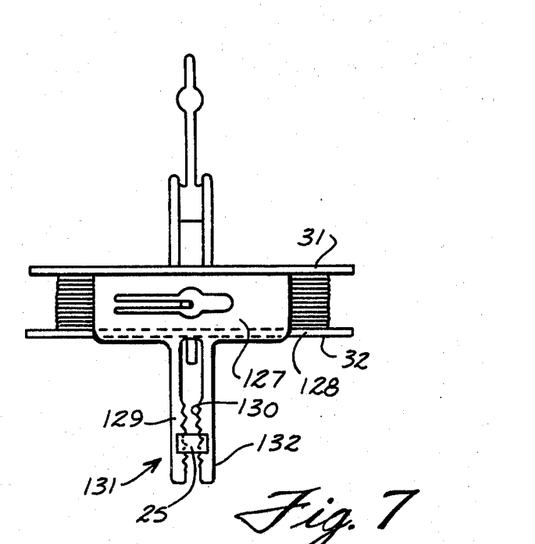
FIG. 7 is a rear view of the coil form assembly of the meter and shows the tail and counterbalance weight for the coil assembly.

FIGS. 5 and 6 show the magnetic circuit which includes the lower yoke element 11, the upper yoke element 12 and the magnet 13. Yoke elements 11 and 12 are formed from magnetic material which is non-magnetically retentive, such as soft iron and cooperate to form a diametrically split yoke ring. Magnet 13 is formed from a permanent magnet material, such as LODEX, and which is capable of being magnetized in a desired direction after the meter is assembled. As previously explained, yoke elements 11 and 12 are identical to each other to reduce the number of different parts needed for the meter.

As shown at FIG. 5, upper yoke element 12 is semicircular and has a step 96 which abuts a mating step 97' of lower yoke element 11. At the other side of the yoke ring, lower yoke element 11 has a step 96' which abuts a mating step 97 on upper yoke element 12. Since the yoke elements 11 and 12 are identical, the steps 96 and 96' are identical and the steps 97 and 97' are identical. Each yoke element has four notches 98. Two of the notches are formed in front face 99 of each yoke element, and two notches are formed in rear face 99' of each yoke element. Each notch presents a generally horizontal abutment surface 100 terminating at a vertical locating surface 101.

Formed in upper yoke element 12 is a horizontal slot 103 of uniform depth which extends the length of the yoke element. Lower yoke element 11 has an identical slot 103'. Magnet 13 is mounted between the yoke elements with its generally rectangular ends 104 and 105 seated respectively in the slots 103 and 103'. The yoke elements and magnet are so dimensioned that magnet 13 is clamped between yoke elements 11 and 12 when the yoke elements are seated in the base as shown at FIG. 4. In addition, the width of the rectangular ends 104 and 105 of the magnet is the same as the width of the rectangular slots 103 and 103', so the magnet is maintained in precise alignment with the central axis of the yoke.

Formed in the front face 99 of the lower yoke element 11 is a vertical slot 106. End 105 of magnet 13 has a notch 107' to provide a locating surface 107. As shown at FIG. 6, when rear surface 108 of magnet 13 is flush with rear surface 99' of yoke elements 11, 12, locating surface 107 projects forwardly of the end of slot 106. Such dimensioning of the yoke elements and the magnet provides for seating lower yoke element 11 in base 10 with its rear surface 99' engaging locating surface 71 (FIGS. 3 and 6) of rear post 70 and with the surfaces of front face 99 at each side of slot 106 engaging the side surfaces 74 of front post 72. As shown in FIGS. 3 and 5, the locating projection 73 has a width which is less than the width of slot 106 so the projection 73 forms no locating function so far as the lower yoke element is concerned. However, projection 73 does engage locating surface 107 of the magnet to urge rear surface 108 of the magnet against surface 71 of post 70. In addition to providing the locating surface 107, the notch 107' provides for mounting magnet 13 in base 10 in only one position, namely the position shown at FIG. 6 where the notch is adjacent the front locating post 72. As shown at FIG. 6, the top edge 108' of the projection 73 of post 72 prevents installing the magnet in any other position, such as upside down or with the notch 107' facing toward rear post 70. Upside down installation of the magnet is not possible because there is no notch in the upper rectangular end 104 of the magnet and hence, the end will not fit between posts 70 and 72. If the magnet is turned so the notch 107' faces toward rear post 70, it is impossible to seat the magnet because the rear post is higher than notch 107'. In addition, the projection 73 permits installing lower yoke element 11 only with slot 106 adjacent front post 72. The steps 96, 96', 97, 97', permit seating the upper yoke element on the lower yoke element only with slot 106' facing the front of the base. Hence, the magnet is always installed in the same position in successively constructed meters and correspondingly, repeatable accuracy of the meters is assured.

By virtue of this arrangement, both magnet 13 and yoke elements 11 and 12 are precisely positioned in a fore and aft direction on base 10. Since the posts 70 and 72 are each relatively rigid fore and aft movement of the magnet relative to the yoke elements is prevented. In addition, the respective locating faces 87–90 of legs 79–82 engage the vertical surfaces 101 of notches 98 in the upper yoke element, whereas the yoke retaining edges 84 and 86 of the respective legs extend across the horizontal abutment surfaces of yoke element 12 to clamp the yoke elements against pad 69. By virtue of this arrangement, the yoke elements and magnet are precisely located on base 10 and are securely held in a predetermined position on the base by the simple expedient of pressing the magnet and yoke elements downwardly into the base to the position shown at FIGS. 5 and 6.

Yoke elements 11 and 12 cooperate to form a yoke ring of uniform cross-section which has inwardly facing cylindrical surfaces 110 and 111 on each side of magnet 13. The sides of the generally elliptical magnet 13 presents arcuately curved outwardly facing surfaces 112 and 113. The surfaces are not precisely cylindrical, but instead are so curved that the crescent shaped flux gaps 14 and 15 each have a uniform flux density therein throughout the angle 114. This angle is on the order of 110° and represents the range of pivotal movement of coil assembly 16. As is apparent, the flux lines 115 in the gap 15 are uniformly spaced, as are the flux lines in the gap 14. This assures that sides 26 and 27 of the coil assimbly are each cut by the same number of flux lines, and that the flux density, in each of gaps 14 and 15 is essentially the same.

It is to be appreciated that the flux density in these gaps need not really be the same to provide for linear deflection of the coil assembly. For such linear deflection, it is, however, quite significant that the sum total of flux which cuts the sides 26 and 27 of the coil assembly be substantially the same for any position of the coil assembly within its effective range of pivotal movement. By so construction the magnet and yoke elements that the sum total of the flux tending to rotate the coil assembly is the same regardless of the angular position of the coil assembly, linear deflection characteristics are obtained. Hence, when coil 18 is energized, the forces acting to rotate the coil assembly are linear and since the forces excerted on the coil by the taut bands 19 and 20 to resist rotation are also linear, the deflection of the coil is linear and in direct proportion to the energizing current in the coil. This arrangement assures a quite accurate linear deflection of the coil with attendant economies related to the decrease in cost of and the number of scale plates required for the assembled meter.

D. THE ZERO ADJUST

By virtue of the torsional effect of taut bands 19 and 20, rotating either front support element 21 or rear support element 22 changes the at rest position of coil assembly 16, and correspondingly provides for adjusting the coil assembly and pointer to a zero position. Hence, support elements 21 and 22 can also be termed zero adjust elements. Adjustment of the zero position is preferably accomplished by the zero adjust knob 7 which has gear teeth 153 which mesh with the gear teeth 30 on front support element 21. The adjusting knob is provided with a semi-cylindrical rear tip 154 which extends into recess 75. The extent of rotation of the knob is limited by engagement of this tip with the stop projection 76 within the recess 75. The head of knob 7 has an annular recess 155 and cross slots 156 to enhance the resiliency of the head so it can be snapped into the opening 8 in cover 2, whereupon the knob is retained by the inwardly projecting bead 157 in the opening 8.

E. THE COVER

Cover 2 is formed fron an optically clear plastic material such as polystyrene. As shown at FIGS. 1 and 12, cover 2 is generally rectangular and has a side wall 188 of a size to fit over face plate 166. The rear of side wall 188 has a rectangular recess with an inner edge 205 that forms an abutment surface against which the front surface of face plate 166 abuts when the cover is in position on the face plate. Formed at the rear edge of the cover are pairs of locking lugs 206 and 207 which are spaced apart and arranged to snap over the pairs of notches 186 and 187 of the face plate so the cover can be quickly snapped into position on the face plate and yet is held against accidental removal. As shown at FIG. 12 the rear edge, 208 of side wall 188 is flush with the rear surface of face plate 166.

The zero adjust knob 7 is snapped into position in the cover before the cover is snapped onto the face plate. Opening 8 in the cover is so positioned that the teeth 153 of the zero adjust knob will mesh with the teeth 30 of front support element 21 when the cover is in position. In addition, the rear tip 154 of the zero adjust knob 7 will be within the recess 75 which functions as a bearing for this rear tip, and also limits the extent of rotation of the knob because of the stop 76.

F. THE PIVOT BEARING ARRANGEMENT

Figure 8:
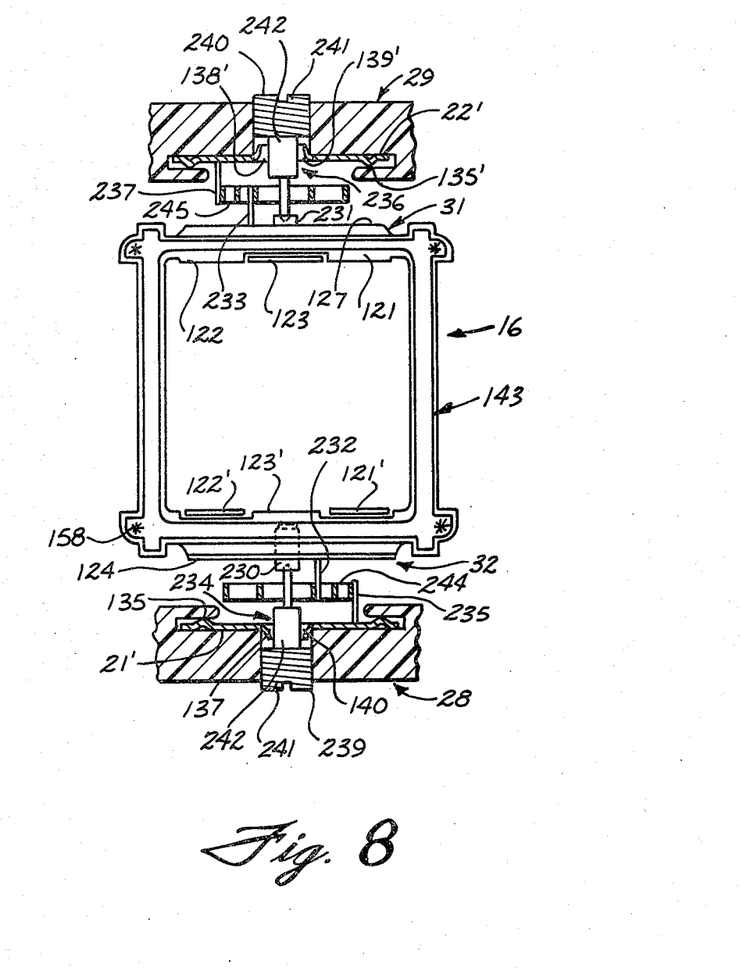
FIG. 8 is an enlarged partial top plan view showing a pivot bearing support arrangement for the meter.

The meter thus far described has been one in which the coil assembly is suspended for pivotal movement by taut bands 19 and 20. A second version of a pivotal mounting for coil assembly 16 is the pivot bearing arrangement of FIG. 8. While FIG. 8 shows a top view of the coil assembly with the magnet, yoke pieces, and portions of the base deleted, it is to be understood that base 10 and the magnetic circuit including magnet 13 and the upper and lower yoke elements 11 and 12 are identical to those previously described for the taut band suspension version of the meter. With reference to FIG. 8 it will be observed that the upper and lower coil form parts 31 and 32 are essentially the same as the coil form parts previously described save that there are some minor modifications. These modifications are best explained with reference to FIGS. 3, and 8. Front plate 124 of lower coil form part 32 is modified by deleting the taut band support finger 142 (FIG. 3) and providing an opening to receive and retain a pivot bearing 230 (FIG. 8). Similarly, rear support plate 127 of upper coil form part 31 has its taut band support finger 146 deleted and is provided with an opening to receive and retain a rear pivot bearing 231.

An additional modification to front plate 124 is the provision of an integral tab 232 (FIG. 8) which projects toward front support structure 28 of the base. There is also a tab 233 which projects toward rear support structure 29 and is integrally formed with rear plate 127.

The front support element 21' and rear support element 22' of the pivot bearing version of the meter are modifications of the support elements for the taut band version of the meter. As will be apparent from the following discussion, the support elements 21' and 22' are more aptly termed zero adjust elements. Front element 21' is quite similar to the front support element 21, previously described. In this regard, there is an annular ring 135 which functions to frictionally restrain front element 21' from rotation, and there are also centering lugs 137, 138', 139' and 140 which center front element 21' in front support structure 28. The taut band support finger 141 (FIG. 3) of support element 21 is deleted in the case of support element 21' to provide an opening 234 (FIG. 8) through the center of support element 21'. In lieu of the previously described taut band support finger 141, front element 21' has an integral tab 235 which extends toward coil assembly 16. Similarly, in the case of rear element 22' there are centering lugs 138' and 139' which have an opening 236 therethrough and an integral tab 237 projects from the rear support element toward coil assembly 16.

The coil assembly of FIG. 8 is supported for pivotal movement by pivot studs 239 and 240. Pivot stud 239 has a pointed inner end which seats in a conical depression in the outer end of front pivot bearing 231 and similarly, pivot stud 240 has a pointed inner end that seats in a conical depression in the outside end of rear pivot bearing 230. The enlarged head 241 of both the pivot studs is external threaded and is of a diameter to be threaded into the opening defined by the curved surfaces 57 and 58 of front support structure 28 as well as into the opening defined by the curved surfaces 63 and 64 in rear support structure 29. The portion 242 of each stud which extends through the respective openings 234 and 236 is smaller than the opening so the front and rear elements 21' and 22' do not engage pivot studs 239 and 240 and hence, the studs do not interfere with rotation of the support elements 21' and 22' during adjustment of the zero position of coil assembly 16. In lieu of the bearing arrangement shown at FIG. 8 the ends of portions 242 of the studs can be provided with conical depressions to provide bearings, and shafts or studs with pointed tips can be fixed to coil assembly 16 in place of the bearings 231 and 234.

A spirally wound front leaf spring 244 is connected between front support element 21' and lower coil form part 32 by welding the inner end of the spring to tab 232 and by welding the outer end of the spring to tab 235. Similarly, a spirally wound rear leaf spring 245 is both mechanically and electrically connected between rear support element 22' and upper coil form part 31 by welding the inner end of the spring to tab 233 and by welding the outer end of the spring to tab 237. The front and rear springs function as return springs to normally maintain the coil assembly in a zero position and to return the coil to this position after the assembled meter is de-energized. Zero adjustment of the coil is accomplished by rotating either the front support element 21' or the rear support element 22'. Where the assembled meter has a front zero adjust knob the knob is located in the cover 2 as shown at FIG. 1. Where the zero adjust knob is at the rear of the meter the zero adjust knob is located in rear wall 181 of casing 4 as shown at FIG. 13.

G. ASSEMBLY

First the manner of assembly of the meter will be summarized and then the assembly steps will be described in greater detail. With reference to FIG. 2, assembly proceeds in the following manner. First, lower yoke element 11 is seated in the base. Next, coil assembly 17 is inserted in the base with the respective support elements 21 and 22 in the support structures 28 and 29 respectively of the base. Then, magnet 13 is inserted through the opening in the coil assembly to a seated position on yoke 11. Next, upper yoke element 12 is pressed downwardly into the base until it snaps into position. Then conductors 35 and 36 are pressed onto the top of the base. Then, pointer 24 is installed and the coil is statically balanced by adding the counterweight 25. Then, the front support element 21 and/or the rear support element 22 are rotated to coarsely set the zero adjustment of the pointer. Next, the flexible conductors 45 and 46 are welded between the respective support elements and conductors 35 and 36. Then, the meter movement so assembled is slipped into casing 4 by merely aligning the base with the opening and pushing the meter movement rearwardly from the position shown at FIG. 1. Scale 5 is snapped onto the back of face plate 166, zero adjust knob 7 is snapped into the opening 8 of cover 2 and cover 2 is snapped onto face plate 165. The conductors of terminal adapter 6 are connected respectively to the conductors 35 and 36 which now project through the rear of the casing and the terminal adapter is seated on the top wall of the casing and secured with the screw 9. Should rectifiers or additional resistors be required these can conveniently be located in the adapter 6. After the meter is assembled magnet 15 is magnetized in the usual manner to calibrate the meter.

With this summary in mind, a more detailed description of the assembly of the meter will now be undertaken. As previously explained with reference to FIG. 4, the central portion 91 of base 10 is flexible and by virtue of this flexibility forces exerted on the sides of the base outwardly in the direction of the arrows 260 cause the center part of the base to flex with the result that the yoke retaining legs 79 and 81 move away from the legs 80 and 82. In addition, the blocks 55 and 56 at the front of the base as well as the blocks 65 and 66 at the rear of the base are spread apart a distance somewhat greater than the outside diameter of the centering lug portions of the front and rear support elements. So spreading the base permits lower yoke element 11 to be easily inserted into the base and also permits inserting the front and rear support elements and the coil simultaneously by a simple downward movement of the assembly of FIG. 16 into the base. By virtue of the notch 106 in the lower yoke element and the arrangement of the posts 70 and 72, the yoke element can only be installed in the base with notch 106 adjacent post 72, as shown at FIG. 6.

The coil assembly can be inserted in the base only with front support element 21 in front support structure 28 and rear support element 22 in rear support structure 29. If the coil assembly is turned around so it faces backwards when assembly is attempted, the bottom of tail 131 of the coil assembly will strike front post 72 of the base and cannot be properly inserted. However, when the coil assembly is properly oriented with pointer receiving staff 24 at the front of the base, tail portion 131 is above recess 92 at the rear of the base and is behind rear locating post 70. Hence, when the coil assembly and support elements are simultaneously inserted in the base, tail portion 131 is located in the region of the recess and the coil assembly can be inserted with no difficulty.

Installation of magnet 13 is accomplished merely by inserting the magnet downwardly into the base to the position shown at FIG. 5 so its lower rectangular end 105 seats in slot 103' of lower yoke element 11. As previously explained, notch 107 of the magnet prevents its installation except with this notch adjacent projection 73 of locating post 72. Upper yoke element 12 can also only be installed in one position because of the steps 96 and 97 of the upper yoke element and the corresponding steps 96' and 97' of the lower yoke element. If the upper yoke element is improperly oriented it cannot be pressed downwardly into the base a sufficient distance to allow the retaining edges 84 and 86 of the yoke retaining legs 79-82 to snap into the notches 98.

Conductors 35 and 36 are then installed by pressing these conductors into position so the posts 41 and 43 extend through the respective openings 42 and 44 of the conductors to secure the conductors on the base in predetermined positions. A coarse adjustment of front and rear elements 21 and 22 is made to approximately adjust the zero position of coil assembly 17. After this coarse adjustment is made braided conductor 45 is welded between conductor 36 and front support element 21 and braided conductor 46 is welded between conductor 35 and rear support element 22. The braided conductors 45 and 46 are sufficiently flexible that the front and rear support elements can be rotated for zero adjustment of the coil after these wires are secured to the respective support elements. Hence, either a front or a rear zero adjust arrangement can be optionally provided for the meter movement. Next, pointer 24 is pushed onto staff 23. No cement is required because the pointer is frictionally retained on the staff by its elasticity. Next, the meter movement is statically balanced. Counterweight 25 is initially installed on tail 131 by very lightly crimping this counterweight. This permits the counterweight to be moved to a different position, if necessary, during the final static balancing of the moving coil assembly. In addition, additional smaller weights can also be added and crimped in position to obtain a perfect static balance. Such changing of the position of balance weight 25 as well as adding weights to tail 131 can be easily accomplished because of the opening 92 at the rear of the base which provides for access to the lower end of tail 131 from below the base.

The meter movement is now in condition to be inserted in casing 4. As shown at FIG. 1, to mount the meter movement in the casing it is merely necessary to align ribs 93 and 94 at the top of the base with the tracks 193 and 194 in the casing and then slide the meter movement rearwardly until fingers 192 of the casing snap into the notches 197 on the front flange of the base whereupon the meter movement is secured to the casing. Then, cover 2 is snapped onto face plate 166 and scale 5 is snapped into a recess in the rear of the face plate. The scale can readily be removed and replaced since it is exposed outside the casing. The scale 5 is accurately located relative, to the meter movement by the locating pins at the rear of face plate 166. Where the terminal adapter assembly 6 is used this terminal adapter is installed next and the meter is then calibrated by magnetizing magnet 13.

A distinct advantage of the meter construction of this invention is the same meter movement 3 can be used for meters of various sizes with no significant additional expense. The only changes required to provide any one of several different size meters are a pointer 24 of the required length for the size of the meter, and a proper counterweight to balance the meter movement. Then, it is merely necessary to select a case, scale, and cover of the appropriate size for the pointer used. It is contemplated that for example, finished meters of a size from 3 inches to 8 inches in increments of 1 inch can be provided without the necessity for any additional manufacturing steps.

The assembly described has been for the taut band version of the meter. With regard to the pivot bearing version of the meter, the assembly steps are generally the same.

While several preferred embodiments of the meter of this invention have been shown and described in detail it is to be understood that numerous changes can be made in the constructions and techniques described herein without departing from the spirit and scope of this invention as defined herein and in the appended claims.

What is claimed is:

1. A meter comprising a supporting base; a magnetic material yoke mounted on said base; a magnet within and engaging said yoke, said magnet and said yoke having cooperating locating surfaces thereon to locate said magnet within said yoke; fixed cooperating locating surfaces on said base, yoke, and magnet for locating said yoke and magnet on said base; said yoke and magnet defining a moving coil receiving space therebetween; a coil extending around said magnet and through said coil receiving space; a zero adjust element at one end of said coil and supported by said base; said zero adjust element and base including cooperating locating surfaces for locating said zero adjust element at a predetermined position on said base; and spring means connected between said coil and said zero adjust element for changing the at rest position of said zero adjust coil in response to movement of said zero adjust element.

2. A meter according to claim 1 wherein said yoke is ring shaped and is transversely split to provide first and second yoke elements; and said magnet is in clamped relation between the yoke elements.

3. A meter according to claim 1 wherein said base is formed from an electrically insulating material and said locating surfaces on said zero adjust element and said base for locating said zero adjust element are each fixed surfaces.

4. A meter according to claim 1 wherein said zero adjust element is mounted on said base for rotation about a predetermined axis.

5. A meter according to claim 1 wherein said spring means is a taut band; said zero adjust element is a combined zero adjust and support element; and said taut band is connected between said zero adjust element and said coil to mount said coil for pivotal movement.

6. A meter according to claim 1 wherein pivot bearing means mount said coil on said base for pivotal movement.

7. A meter according to claim 1 wherein said zero adjust element is of one piece construction and includes integral tab means for connecting said spring means thereto, and said zero adjust element has integral gear teeth thereon for direct engagement by gear teeth on a zero adjust knob mounted for rotation relative to the base.

8. A meter comprising a base, a magnetic material first yoke piece seated in said base; cooperating surface and projection means on said base and first yoke piece for accurately positioning same in said base; a second yoke piece seated on said first yoke piece; cooperating surface and projection means on said base and second yoke piece for accurately positioning said second yoke piece relative to said base and first yoke piece; a magnet between said yoke pieces, said magnet having portions engaging said yoke pieces and portions spaced from said yoke pieces to define a coil receiving space; a coil extending through said space between said magnet and yoke pieces, and support means carried by said base and mounting said coil for pivotal movement; said base including locating surfaces thereon locating said support means along a predetermined axis on said base.

9. A meter according to claim 8 wherein said cooperating surface and projection means on said base and yoke pieces are each fixed; and said locating surfaces for locating said support means are fixed surfaces.

10. A meter according to claim 8 wherein said yoke pieces are each semi-circular and cooperate to form a diametrically split yoke ring.

11. A meter according to claim 10 wherein said first yoke piece includes a pair of upwardly projecting stepped abutment surfaces; and said second yoke piece includes a pair of downwardly facing stepped abutment surfaces; said abutment surfaces engaging each other in two locations to enhance magnetic continuity of the yoke ring.

12. A meter according to claim 8 wherein said second yoke piece has notches at each end thereof; and cooperating retaining arms on said base engage surfaces of said notches to secure said second yoke piece against movement relative to the base.

13. A meter according to claim 8 wherein said locating surfaces for locating said support means along a predetermined axis on the base include, a first pair of spaced apart arcuate surfaces on said base at one end of said coil and a second pair of spaced apart arcuate surfaces on said base and at the other end of said coil.

14. A meter according to claim 13 wherein said support means include a first support element, and a second support element; said first and second support elements each having positioning surfaces thereon in engagement respectively with said pairs of arcuate locating surfaces of said base, said respective surfaces mounting said support elements for rotation about a common axis; and taut band suspension means connected respectively between said first and second support elements and said coil.

15. A meter according to claim 13 wherein said support means includes a first screw threaded into said arcuate locating surfaces at one end of said base and a second screw threaded into said arcuate surfaces at the other end of said base, said screws each having an end portion; and cooperating means carried by said coil and engaged by first and second pivot screws; said end portions and cooperating means providing bearing and pivot means for mounting said coil for rotation.

16. A moving coil meter comprising, in combination a supporting base; a yoke seated in said base; cooperating locating means on said base and yoke to permit mounting said yoke in one position and orientation only on said base; a magnet; cooperating locating means on said magnet and base to permit mounting said magnet in one position and orientation only on said base; a moving coil assembly; and means on said base for mounting said coil assembly thereon in a predetermined position relative to said magnet and yoke.

17. A meter according to claim 16 wherein said base and moving coil assembly further include cooperating means to permit mounting said moving coil assembly in one position and orientation only on said base.

18. A meter according to claim 16 wherein said cooperating locating means on said base and yoke comprises a notch in said yoke, a first locating projection of a dimension to be received in said notch, and a second locating projection of a dimension greater than said notch; said first and second projections cooperating with said notch to permit installing said yoke only with said notch facing toward and adjacent to said first projection.

19. A meter according to claim 16 wherein said cooperating locating means on said magnet and base include, first and second locating surfaces on said magnet, first and second positioning surfaces on said base, said first locating surface on said magnet cooperating with said first locating surface on said base to permit installation of said magnet only when said first surfaces are adjacent each other and said second surfaces are adjacent each other, said first surface of said base interfering with said second surface of said magnet to prevent installation of said magnet upon misorientation of said magnet relative to said base.

20. A meter according to claim 16 wherein said yoke is comprised of two identical yoke halves which cooperate to form a generally cylindrical yoke ring, each of said yoke elements having a locating notch thereon cooperating with a projection on said base to permit installation of one of said elements in one position only, and cooperating locating surfaces on said elements to permit installing the other of said elements in engagement with said first element in one position only.

21. A meter according to claim 19 wherein said magnet includes first and second diametrically opposed locating surfaces; said yoke elements have locating recesses therein engaging said locating surfaces of said magnet; and said magnet includes a positioning surface cooperating with said first projection to permit installation of the magnet in one position only within said yoke.

22. A meter comprising a non-magnetic material supporting base; a magnetic material yoke mounted on said base; a magnet within and engaging said yoke to form a magnetic assembly; said magnet and said yoke having fixed cooperating locating surfaces thereon to locate said magnet within said yoke; cooperating locating surfaces on said base and yoke, for locating said magnetic assembly on said base; said yoke and magnet defining a moving coil receiving space therebetween; a coil extending through said coil receiving space; a zero adjust element spaced from on end of said coil; and support means carried by said base for supporting said zero adjust element for rotation; said zero adjust element and support means including cooperating locating surfaces for locating said zero adjust element at a predetermined position on said base; and spring means connected to said coil for changing the at rest position of said coil in response to rotation of said zero adjust element.

23. A meter according to claim 22 wherein said cooperating locating surfaces for locating said zero adjust element comprise, a surface of the zero adjust element facing toward said coil and a surface of the base facing away from the coil and between the zero adjust element and the coil.

24. A meter according to claim 23 wherein said surface of the zero adjust element engages said surface of the base.

25. A meter according to claim 23 wherein said surface of the zero adjust element is resiliently urged toward said surface of the base.

26. A meter according to claim 22 wherein said yoke is ring shaped and is transversely split to provide first and second yoke elements; said cooperating surfaces on said magnet and yoke locate and retain said magnet with respect to the yoke, and said base clamps said yoke elements against the magnet.

27. A moving coil meter comprising, in combination a unitary supporting base; a magnet; a yoke seated in said base; cooperating locating means on said base, magnet and yoke for positioning and retaining said yoke and magnet on said base; a moving coil assembly; and means on said base for mounting said coil assembly thereon in a predetermined position relative to said magnet and yoke.

28. A moving coil meter according to claim 22 wherein said unitary base is generally by-symetrical about a longitudinal plane and is open in one traverse direction.

29. a moving coil meter according to claim 27 wherein said cooperating locating means on said base for positioning and retaining said magnet and yoke include first and second means spaced apart from each other in a direction longitudinally of the base, said first and second means each having surfaces facing toward each other; and latch finger means engaging the yoke to prevent separation of the magnet and yoke from said base.

30. A moving coil meter according to claim 27 wherein said unitary base further includes conductor locating means for accurately locating at least one rigid conductor in a predetermined position on said base.

31. A moving coil meter according to claim 30 wherein said conductor locating means includes first and second pairs of conductor locating posts.

32. A moving coil meter according to claim 27 wherein said unitary base further includes bearing means to support and limit the extent of rotation of a zero adjust knob.

33. A moving coil meter according to claim 27 wherein said unitary base further includes latch finger means for snap-connecting said base to a casing.

34. A moving coil meter according to claim 27 wherein said unitary base further includes, track means at opposite sides of said base for guiding said base into a seated position in a casing.

35. A moving coil meter according to claim 27 wherein said unitary supporting base comprises, a body portion of non-magnetic material; said cooperating locating means on said base are on said body intermediate the ends thereof; said means for mounting said coil assembly include first support means having an arcuate surface for rotatably mounting a first support element of the coil assembly on the body; second support means at the other end of said body, said second support means having an arcuate surface in alignment with the arcuate surface of said first support means for rotatably mounting a second support element of the coil assembly thereon; and surface means on said body to prevent displacement of the first and second support elements toward each other.

36. A moving coil meter according to claim 35 wherein said supports of said first and second support means are disposed respectively on opposite sides of the longitudinal center of said base, and said base is elastically deformable generally along said central plane; whereby, said supports can be temporarily moved away from each other to facilitate mounting the first and second support elements for rotation on said arcuate surfaces.

37. a moving coil meter according to claim 35 wherein said first support means includes a pair of spaced apart supports disposed respectively at opposite sides of the longitudinal center of said body, said supports having arcuate surfaces facing each other for rotatably mounting said coil assembly first support element therebetween; and said second support means includes a pair of spaced apart supports having arcuate surfaces facing each other for rotatably mounting the movable assembly second support element therebetween.

38. A supporting base according to claim 35 wherein said body has a generally semi-circular side wall and opens upwardly, said side wall having upwardly facing support surface means for the yoke, and said yoke and magnet positioning and retaining means includes longitudinally spaced locating surfaces for locating said yoke and magnet longitudinally of said base.

39. A moving coil meter comprising, in combination a supporting base; a yoke seated in said base; cooperating locating means on said base and yoke to permit mounting said yoke in one position and orientation only on said base; a magnet; cooperating locating means on said magnet and base to permit mounting said magnet in one position and orientation only on said base; a moving coil assembly; means on said base for mounting said coil assembly thereon in a predetermined position relative to said magnet and yoke; said base and moving coil assembly including cooperating means to permit mounting said moving coil assembly in one position and orientation only on said base; said moving coil assembly including a pointer supporting staff adjacent one end thereof, and a counter balance weight supporting portion at the other end thereof; said pointer supporting staff extending in a first direction and said weight supporting portion extending in an opposite direction; said base including a surface for preventing installation of said coil assembly with said counter balance weight portion adjacent a front portion of said base, and including a recess permitting installation of said coil assembly with said counter balance portion adjacent a rear portion of said base; whereby, said coil assembly can be installed in said base in only one position and orientation.

* * * * *